United States Patent [19]

Julius et al.

[11] Patent Number: 5,474,199
[45] Date of Patent: Dec. 12, 1995

[54] RESUABLE LID AND CONTAINER CONSTRUCTION

[75] Inventors: Robert P. Julius, Greenwich, Conn.; Robert McClain, Crossriver, N.Y.

[73] Assignee: Nice-Pak Product, Inc., Orangeburg, N.Y.

[21] Appl. No.: 189,043

[22] Filed: Jan. 31, 1994

[51] Int. Cl.6 ............................. B65D 43/16; B65D 51/04
[52] U.S. Cl. ........................ 220/339; 220/254; 220/259
[58] Field of Search .................................. 220/324, 334, 220/337, 339, 254, 259, 352, 908

[56] References Cited

U.S. PATENT DOCUMENTS

| | | |
|---|---|---|
| 685,900 | 11/1901 | Anderson . |
| 1,968,943 | 8/1934 | Hermani . |
| 3,442,414 | 5/1969 | Pelli . |
| 3,780,908 | 12/1973 | Fitzpatrick et al. . |
| 3,812,993 | 5/1974 | Yoshioka et al. . |
| 3,831,798 | 8/1974 | Rowe et al. . |
| 4,113,136 | 9/1978 | Abbott . |
| 4,358,025 | 11/1982 | Urion . |
| 4,431,114 | 2/1984 | Kleinfeld . |
| 4,465,205 | 8/1984 | Sutch . |
| 4,649,813 | 3/1987 | Kehl . |
| 4,844,270 | 7/1989 | Coffman ................................ 215/274 |
| 4,883,193 | 11/1989 | Christensson . |
| 4,905,861 | 3/1990 | Boxall et al. . |
| 4,932,549 | 6/1990 | Gouttefangeas . |
| 4,934,557 | 6/1990 | Smith . |
| 5,002,197 | 3/1991 | Ponsi . |
| 5,012,928 | 5/1991 | Proffitt et al. . |
| 5,048,715 | 9/1991 | Wolff ................................... 220/338 X |
| 5,050,763 | 9/1991 | Christensson . |
| 5,085,339 | 2/1992 | Roth et al. . |
| 5,145,088 | 9/1992 | Goujon . |
| 5,219,087 | 6/1993 | Christensson ...................... 220/339 X |
| 5,353,946 | 10/1994 | Behrend ............................. 220/254 X |

FOREIGN PATENT DOCUMENTS

| | | |
|---|---|---|
| 0103753 | 3/1984 | European Pat. Off. . |
| 0356322 | 2/1990 | European Pat. Off. . |
| 2496056 | 6/1982 | France . |
| 1257094 | 12/1971 | United Kingdom . |
| 9317920 | 9/1993 | WIPO . |

OTHER PUBLICATIONS

Chubs® Stackables™ (advertisement and photograph enclosed); L & F Products, Montvale, N.J. 07645.

*Primary Examiner*—Stephen P. Garbe
*Assistant Examiner*—Nathan J. Newhouse
*Attorney, Agent, or Firm*—Banner & Allegretti, Ltd.

[57] ABSTRACT

A reusable cover or lid and container comprising a cover having a lid tray and a peripheral flange, the lid tray having a top face and a bottom face and side walls that are substantially perpendicular to the top face and bottom face of the lid tray, the side walls having an outside surface and an inside surface, the peripheral flange having outside and inside walls, the inside surface of the side walls of the lid tray being complementary to and adapted to fit around the outside walls of the peripheral flange to form a first interface fit, the lid tray and the peripheral flange connected by a hinge, so that the angle between the lid tray and the peripheral flange can be altered and the first interface fit can be made or disengaged as desired, a container defining a cavity, the container having a bottom and outside walls and a rim that defines an opening to the cavity, the peripheral flange being complementary to and adapted to fit around the outside walls of the container and abut against the rim of the container to form a second interface fit, the second interface fit made when the peripheral flange is slid along the outside walls of the container until it abuts against the rim of the container.

3 Claims, 10 Drawing Sheets

RESUABLE LID AND CONTAINER CONSTRUCTION

BACKGROUND OF THE INVENTION

The instant invention is directed to a container with a reusable lid or container cover that has a substantially airtight seal and wherein the cover can be reused with a new container body when the previous container body becomes empty, There are a number of different cover and container combinations disclosed in the prior art. Typically a cover is attached to the rim of a container; see, for example, U.S. Pat. No. 5,145,088. As noted in U.S. Pat. No. 5,145,088, a cover may consist of a central plate and a peripheral flange defining a U-shaped cross-section having two arms, namely an outer and inner arm, each of which are joined by a segment. The inner arm is, in turn, joined to the central plate, and thus the periphery of the cover snaps onto a matching rim of a container. As further pointed out in U.S. Pat. No. 5,145,088, although this combination is in wide-spread use, this design has a drawback that the cover is sometimes difficult to remove from or reattach to a container.

U.S. Pat. No. 5,145,088 further describes an improved cover that snaps onto the matching rim of a container or dish, having the additional features of a segment that joins the inner and outer arms of the U-shaped cross-section of the peripheral flange wherein, the joining segment includes a slit which extends around substantially the entire periphery of the flange thereby defining two mutually opposite lips. Associated with the slit are a plurality of narrow tab portions which connect the two lips. U.S. Pat. No. 5,145,088 also describes a cover that includes a griping tab which is integral with the lip connected to the inner arm of the U-shaped cross section, and is thus connected to the central plate. On the side opposite the lip having the gripping tab are hinge segments connecting the two lips. Although this structure purports to overcome difficulties associated with the prior art, the structure disclosed in U.S. Pat. No. 5,145,088 constitutes a cover that is "snapped" onto the matching rim of a container, known as "top-loading". Thus, the disclosed construction has certain drawbacks associated with cover removal from and cover reattachment to a container.

SUMMARY OF THE INVENTION

The present invention seeks to overcome the described drawbacks of the prior art. In a preferred embodiment of the present invention, the reusable lid or cover and container are made of suitable materials, e.g. flexible plastic. The cover comprises a lid tray and a peripheral flange hinged to the tray along an edge of the tray. The lid tray has a top face and a bottom face and a circumferential side wall that is substantially perpendicular to the top face and bottom face of the lid tray. The side wall has an outside surface and an inside surface. The inside surface of the side wall of the lid tray is complementary with and adapted to snugly fit around the outside wall of the peripheral flange. This fit can be a friction fit or a snap fit or a combination thereof.

The lid tray and the peripheral flange are connected by a living, integrally molded hinge. The lid tray can thus be pivoted about the peripheral flange between an open and a closed position, that is between a position of disengagement of the circumferential side wall and flange and a position of engagement thereof.

With this preferred embodiment, the container defines a cavity having a bottom and outside walls and a circumferential rim for the cavity. Also in this preferred embodiment, the rim extends out from and is substantially perpendicular to the outside walls forming the container body. The rim can alternatively be rolled or curled. In addition, in this preferred embodiment, there is at least one lug positioned on the outside container wall near the top of the wall.

The peripheral flange of the cover is complementary to the outside wall of the container body, and abuts snugly against the rim of the container to define a form fit. The peripheral flange and container are sized and shaped so that the flange can be slipped over the bottom of the container so as to slide upwardly and along the outside walls of the container until it fits against the rim of the container being held thereby by lugs or tabs molded into the outside container wall. The flange can thus be friction fit or snap fit onto the container.

This "bottom-loading" arrangement of peripheral flange and the fit between that flange and the lid tray as well as the fit between that flange and the container body permit easy attachment to and removal of the cover from the container and covers the opening defined by the rim of the container body. This construction provides a generally airtight seal to better preserve the contents within in the container.

When removing the cover, all one has to do is push the peripheral flange downward along the outside walls of the container, thereby disengaging the fit between the flange and the container.

Thus, the present invention eliminates the need associated with prior art "top-loading" structures to align and press the peripheral flange into the matching rim of the container, only to later be forced to grip the flange and pull it off of the container.

In the present invention, the fit between the peripheral flange of the cover and the container and the fit between the lid tray and the hinged peripheral flange result in a substantially airtight seal that separates contents in the cavity of the container from outside air. Thus, the present invention is particularly useful for the containment of moist products, such as moist baby tissue wipes, that require airtight storage.

When the material retained in the cavity of the container is exhausted or depleted, the cover of the present invention can be easily removed from the empty container and reused with a new, filled storage and dispensing container body. For example, when the present invention is used for a moist tissue wipes, a plastic sheet attached by an adhesive to the rim of the container body to provide an airtight seal for the contents in the cavity of the container can be pulled off the rim. The peripheral flange can then be slipped from the bottom of the container and up along the side walls of the container until the inside wails of the flange abuts the container rim. The lid tray can then be closed tightly on the peripheral flange to complete the airtight seal and cover the contents in the cavity in the container.

The lid tray can be easily lifted off of the flange when it is desired to remove a tissue wipe, e.g. by gripping a tab on the lid tray and lifting the tray up and away from the container body. This tab can be on the top face or the outside surface of a side wall of the lid tray.

The lid tray can be easily placed back down onto the flange to again seal the lid tray and thereby cover the contents in the cavity of the container.

When it is desired to reuse the cover for a new container, e.g. when the cavity of the previous container becomes empty, the peripheral flange is pushed downward from the container rim and disengaged from the container. The attachment of the cover to a new container can then be accomplished.

Thus, it is an object of the present invention to provide a package or receptacle comprised of a lid or cover and a container that is easy to use and manufacture.

Another object of the present invention is to provide a receptacle that has a substantially airtight seal.

Another object of the present invention is to provide a receptacle having a cover that can be reused by removing the cover from a container that has become empty and reattaching the cover to another container that is not empty. The present invention is particularly useful for storage of products that require an airtight seal, e.g. moist baby tissue wipes.

Other objects of the invention are to provide environmental and cost benefits by eliminating the need for a separate heavier weight plastic container to house the refill container as used in the prior art, e.g. in prior art container constructions to store and dispense moist baby tissue wipes.

As another object and benefit of the invention, container bodies can easily be stored on top of one another, and can easily be separated, thereby providing advantages in storage and manufacture.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 15a is a cross-sectional view of the lid of FIG. 15 taken along the line 15a—15a;

DETAILED DESCRIPTION OF THE PREFERRED EMBODIMENTS

The following description focuses on one of many possible applications for use of the reusable lid or cover and container of the present invention; namely, for holding and dispensing moist baby tissue wipes. Many applications are possible and the invention is not limited to the described applications.

Referring to the embodiment of FIGS. 1 through 4, a receptacle 1 includes a cover or lid 2 and a container or container body 15. Cover 2 is comprised of a lid tray 3 having a connected, hinged peripheral flange 4. Lid tray 3 has a top face 5, a bottom face 6 and a peripheral or circumferential side wall 7. Side wall 7 is substantially perpendicular to the top face 5 and bottom face 6 of lid tray 3. Further, side wall 7 has an outside surface 8 and an inside surface 9.

Peripheral flange 4 has a depending outside wall 10 and a generally parallel, spaced inside wall 11 connected by a top web 38. Inside surface 9 of side wall 7 of lid tray 3 is complementary to and adapted to fit around the outside wall 10 of peripheral flange 4 to form a generally congruent, snug, airtight fit defined by the interface 12 of flange 4 and wall 10. Interface 12 can be either a friction fit or a snap fit or a combination thereof.

Lid tray 3 and peripheral flange 4 are connected to each other by a hinge 14 and thus may pivot through an angle 13. Hinge 14 is flexible or living so that the angle 13 between the lid tray 3 and peripheral flange 4 can be altered and the interface 12 can be made or disengaged as desired.

Container 15 defines a product cavity 16. Container 15 also has a bottom 17 and outside walls 18 and a peripheral, outwardly projecting rim 19. Rim 19 thus defines an opening 20 to cavity 16. Rim 19 extends out from and substantially perpendicular to outside walls 18 of container 15. At least one outside wall 18 has a projecting lug 21 that is positioned substantially at the top of outside wall 18 and adjacent to rim 19.

Peripheral flange 4 is complementary to and adapted to fit around outside walls 18 retained by projecting lug 21 and abutted against rim 19 of container 15 to define a second interface 22 between the inside wall 11 of the peripheral flange 4 and the outside walls 18 of container 15 adjacent to rim 19. The flange 4 is fitted on container 15 when the lid tray 3 and peripheral flange 4 are opened so that peripheral flange 4 can be slipped from below bottom 17 of container 15 upward and along outside walls 18 of container 15 until peripheral flange 4 fits around lug 21 and abuts against rim 19 of container 15. Interface 22 can be effected either by a friction fit or a snap fit or a combination thereof.

Further, hinge 14 can be then closed so that the inside surface 9 of lid tray 3 fits over outside walls 10 of peripheral flange 4, thereby covering contents 23 that may be contained within cavity 16 of container 15, and thereby provides an airtight seal 24 that serves to separate contents 23 from elements such as air that are outside receptacle 1.

When it is desired to remove some or all of contents 23 from the cavity 16 of container 15, cover tab 25, which projects from lid tray 3 opposite hinge 14, can be gripped and pulled upward, thereby lifting the lid tray 3 off and away from the peripheral flange 4 and opening 20 of container 15. Lid tray 3 can also have a latch 26 that fits into a notch 27 of peripheral flange 4. Latch 26 can be engaged with or disengaged from notch 27 as desired.

In addition, container 15 can be configured so that outside walls 18 taper toward bottom 17. In this embodiment, peripheral flange 4 can be more easily slid underneath bottom 17 and up along outside walls 18 until it fits snugly against rim 19.

FIGS. 5, 6, 7, 8, 9 and 10 show alternative construction to retain the peripheral flange 4 on the container 15, each way involving the sliding of the peripheral flange 4 underneath bottom 17 and then along the outside walls 18 of container 15 to engage the container 15 on rim 19.

Figure 1:
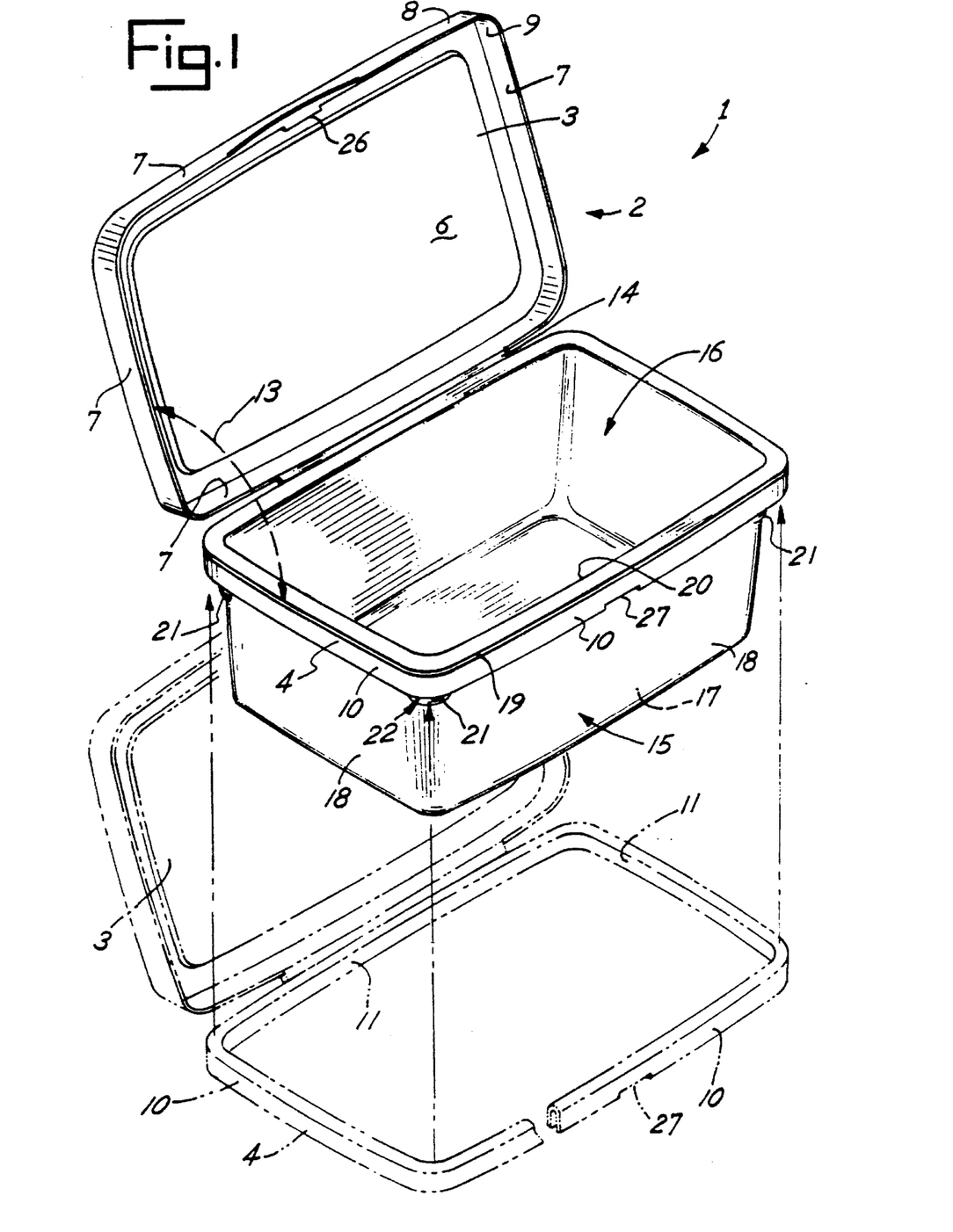
FIG. 1 is a perspective view of a first preferred embodiment of the present invention, showing the attachment of a cover to an empty container.
Figure 2:
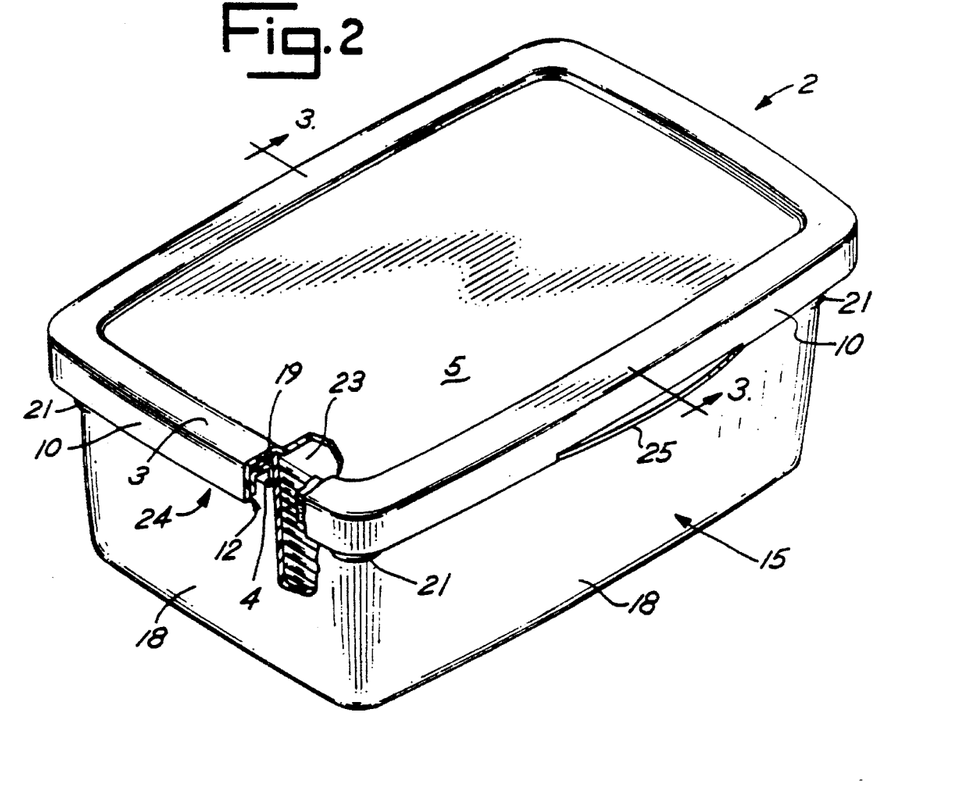
FIG. 2 is a perspective view of the first preferred embodiment of the present invention, showing the cover closed over the container and its contents.
Figure 3:
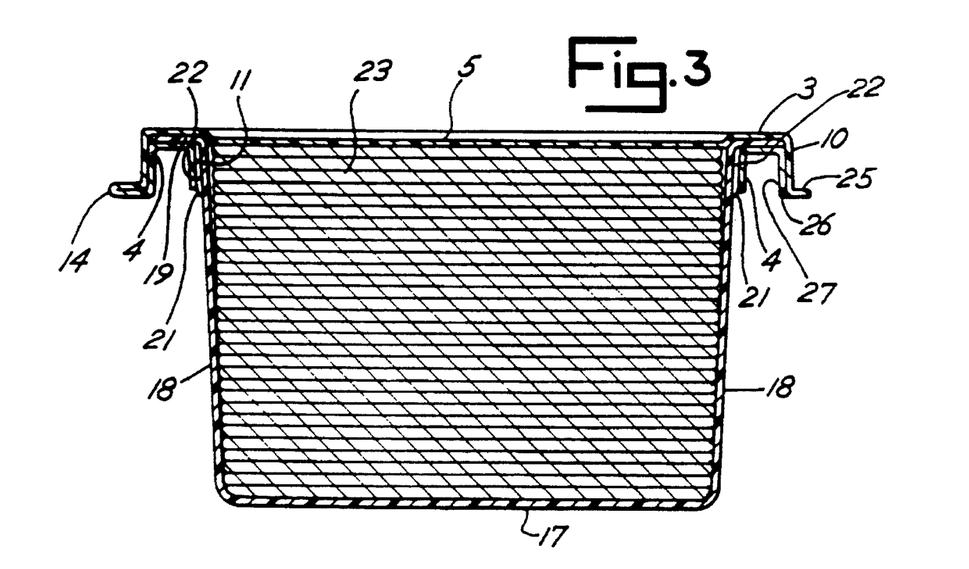
FIG. 3 is a side cross-sectional view of the preferred embodiment of the present invention, taken along line 3—3 of FIG. 2.
Figure 4:
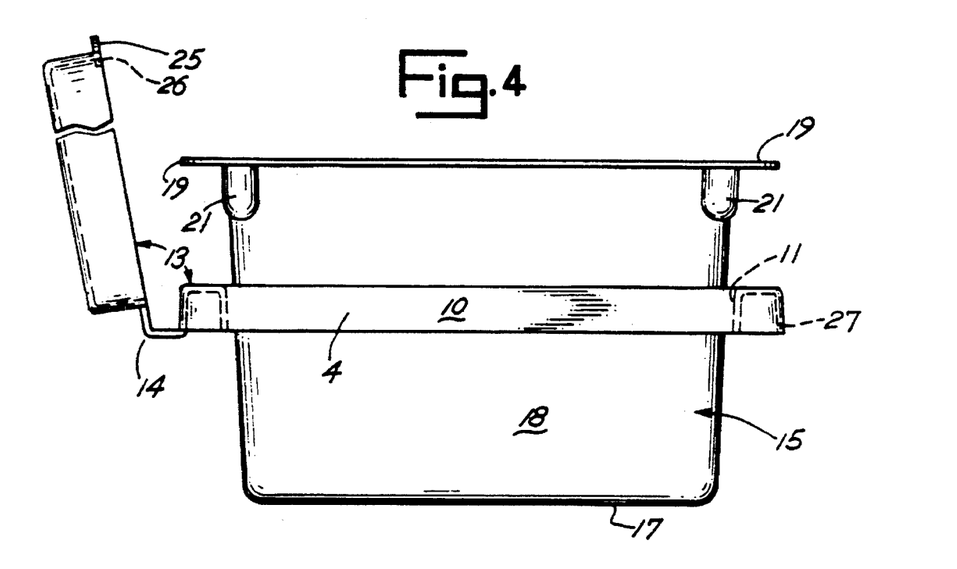
FIG. 4 is a side elevation view of the first preferred embodiment of the present invention.
Figure 5:
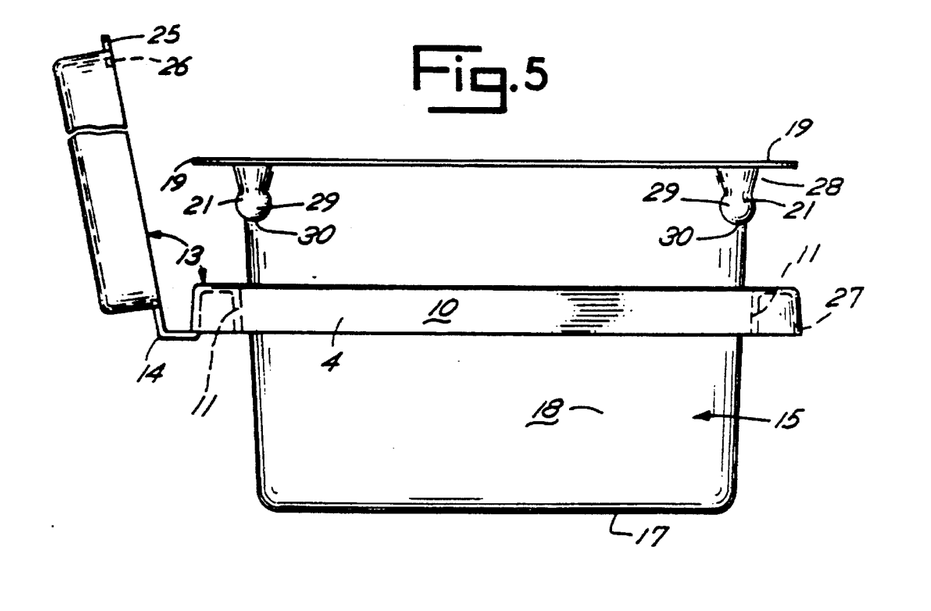
FIGS. 5, 6, and 7 are side elevation views of alternative preferred embodiments of the present invention, showing alternative ways to form a fit between the container and a peripheral flange of a cover.

FIG. 5 illustrates use of a lug 21 at corner 28 of container 15 to coact with flange 4 of cover 3. Lug 21 includes a nub 29 at an end 30 that is spaced from rim 19. One or more corners 28 of container 15 can have such a nub 29 as desired. The inner wall 11 coacts with nub 29 and is thereby retained on container 15.

Figure 6:
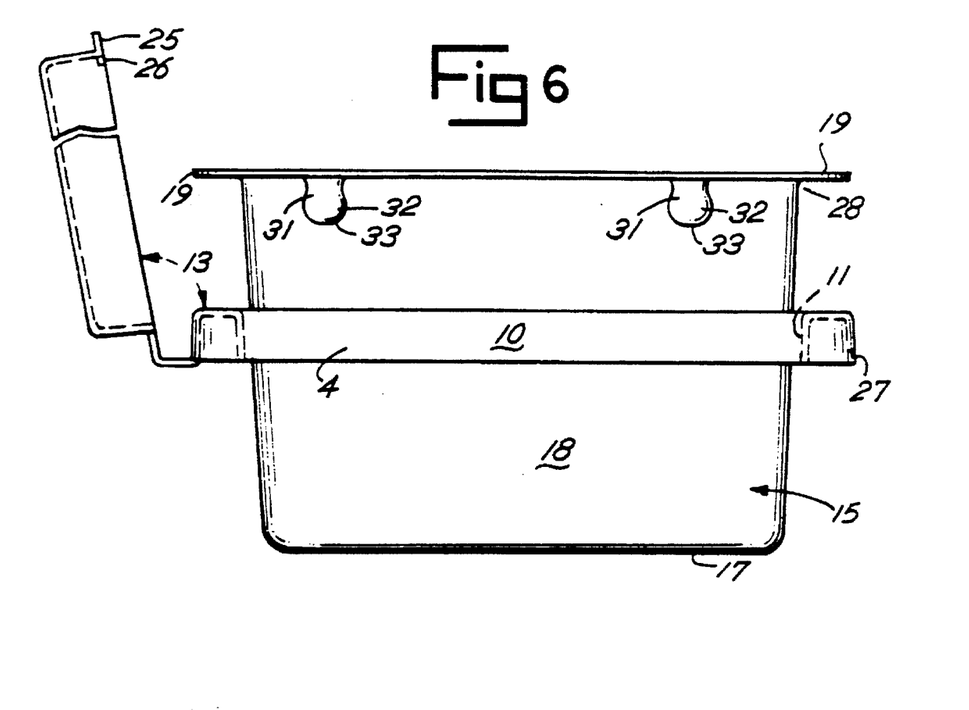

FIG. 6 depicts a lug 31 molded on the outside surface of wall 18 of container 15, but not at a corner 28 of container 15. Lug 31 includes a nub 32 at an end 33 that is spaced from rim 19 in a manner which facilitates retention of peripheral flange 4 against rim 19. Multiple lugs 31 of such configuration may be molded in a desired pattern on wall 18.

Figure 7:
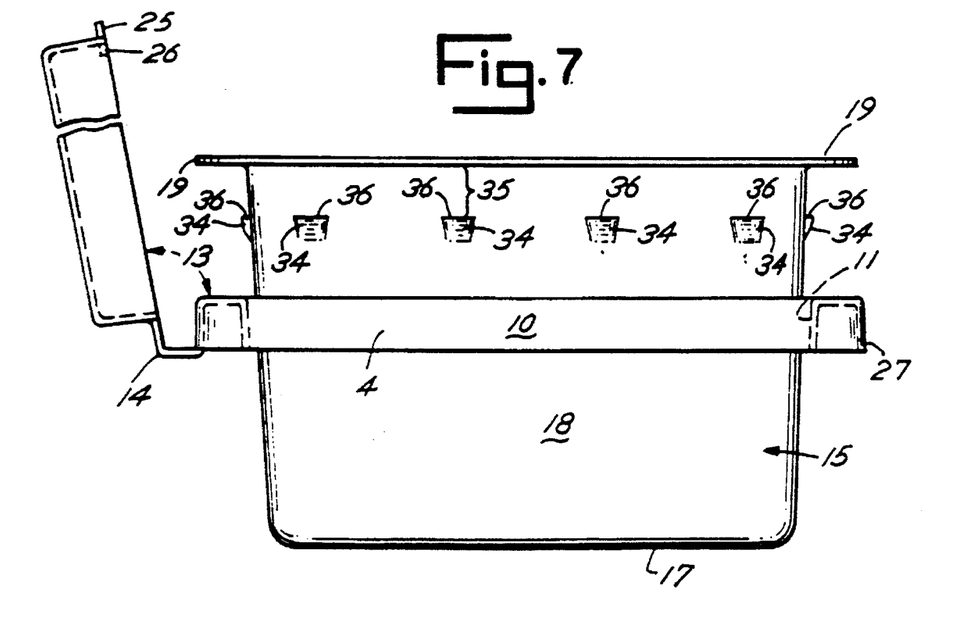
Figure 8:
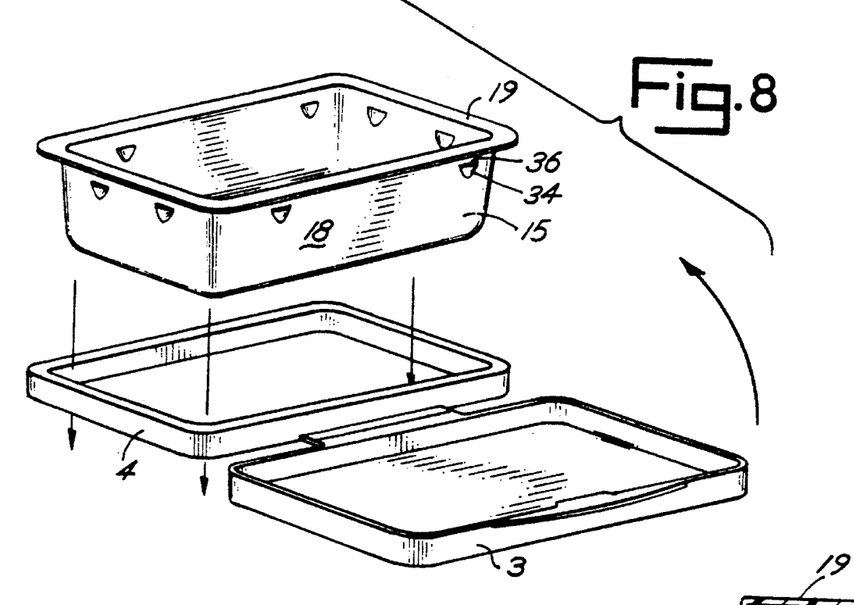
FIG. 8 is a perspective view of the embodiment of FIG. 7.
Figures 8A, 9:
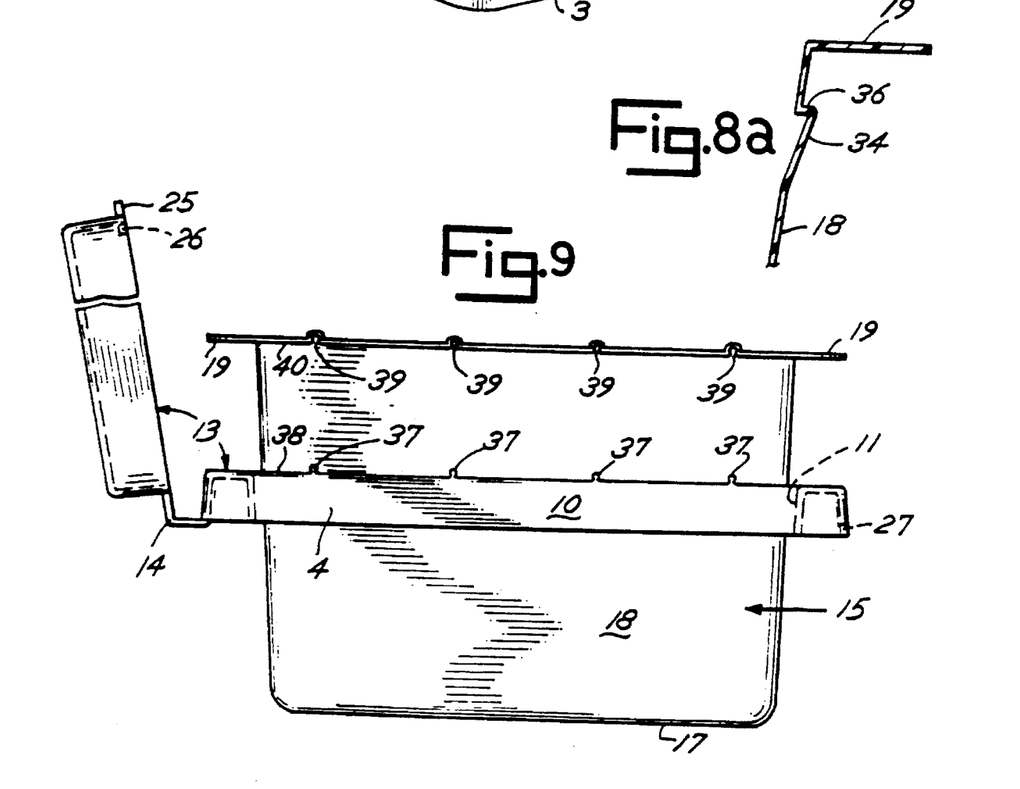
FIG. 8a is an enlarged detail cross-sectional view of FIG. 8.
FIG. 9 is a side view of another alternative embodiment of the invention, showing another way to form the fit between a container and the peripheral flange.

FIGS. 7 and 8 show a similarly shaped triangular projection 34 that is a spaced from rim 19 by a dimension 35 substantially equal to the height of wall 11. The projection is molded into the wall 18 as depicted in FIG. 8a. In this embodiment, projection 34 is positioned on the container 15 so that it forms a ledge 36 that holds the peripheral flange 4 against rim 19 as desired.

FIG. 9 depicts another embodiment wherein peripheral flange 4 includes a protrusion 37 from the top of web 38 that corresponds to and is adapted to snap-fit into congruent openings 39 molded into the bottom 40 of rim 19. The snap-fit connection between protrusion 37 and opening 39 holds the peripheral flange web 38 against rim 19.

Figure 10:
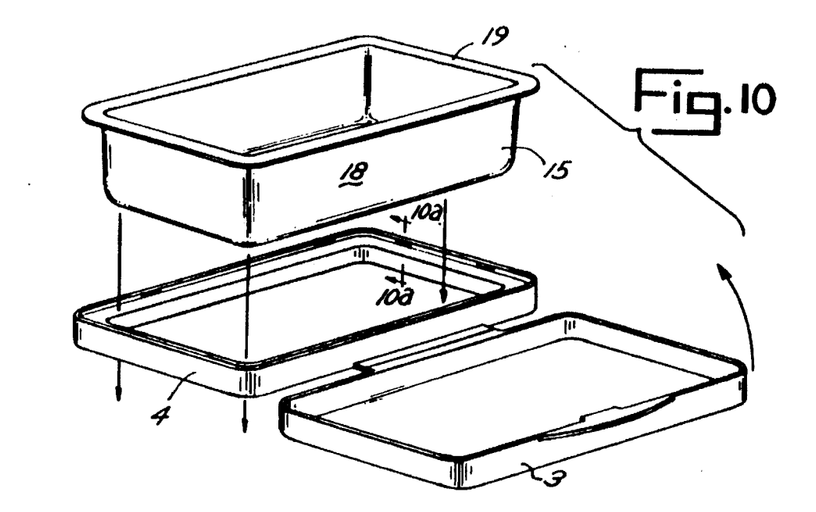
FIGS. 10, 11, 12, 13, and 14 are perspective views of further alternative preferred embodiments of the invention, showing alternative ways to form the fit between a container and a peripheral flange.
Figure 10A:
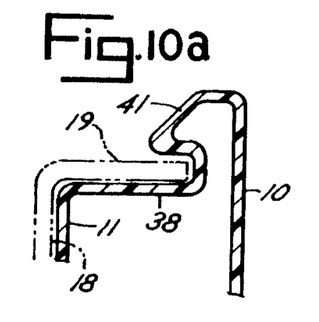
FIG. 10a is an enlarged detail cross-sectional view of FIG. 10.

FIGS. 10 and 10a depict another embodiment wherein peripheral flange 4 and more particularly web 38 includes a molded hook or lip 41 that is adapted to snap-fit over rim 19 and hold the peripheral flange 4 against rim 19.

Figures 11, 11A:
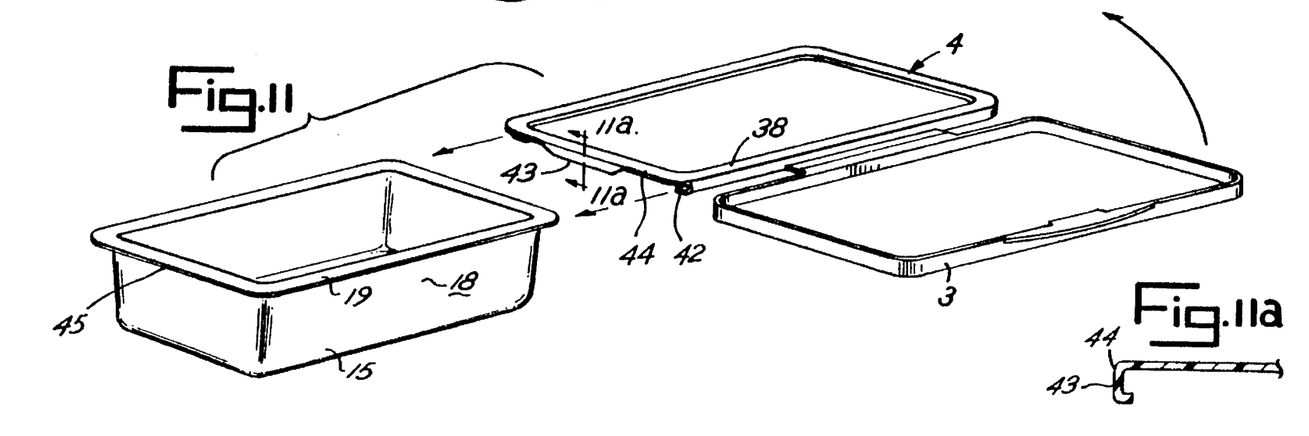
FIG. 11a is an enlarged detail cross-sectional view of FIG. 11.

FIGS. 11 and 11a depict another embodiment wherein the peripheral flange 4 can be "top-slide" loaded onto the rim 19 of container 15. In this alternative embodiment, a second web 42 parallel to and spaced from web 38, is provided on three sides of flange 4. Webs 42 and 38 are spaced so that rim 19 will slide there between and inner wall 11 is eliminated. The peripheral flange 4 also has a flexible lip 43 on one remaining side 44. Lip 43 corresponds to and is adapted to snap-fit around end 45 of rim 19 to hold the peripheral flange 4 against rim 19 after flange 4 slides onto rim 19.

Figure 12:
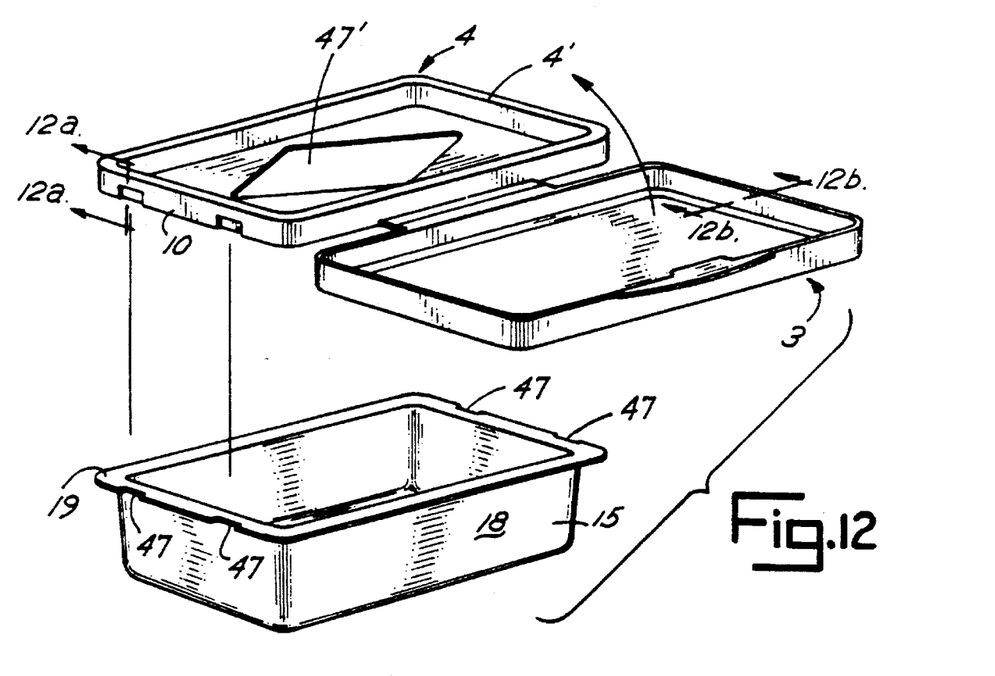
Figure 12A:
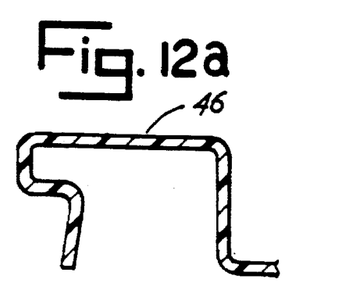
FIGS. 12a and 12b are enlarged detail cross-sectional views of FIG. 12.
Figure 12B:
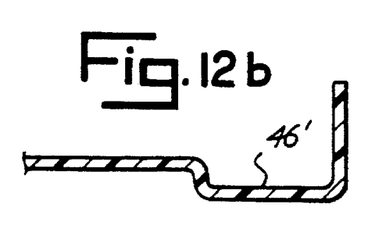

FIGS. 12 through 12b depict an embodiment wherein the outer wall 10 of the peripheral flange 4 slides from the top down onto rim 19. Wall 10 of peripheral flange 4 has an inward protrusion 46 that corresponds to and is adapted to fit into slot 47 in rim 19 to hold the peripheral flange 4 against rim 19. Lid tray 3 has a recess 46' that is designed to fit around the top face 4' of peripheral flange 4 to increase the airtight seal between the peripheral flange 4 and the lid tray 3. Peripheral flange 4 defines an opening 47', having a substantially parallelogram shape, from which contents 23 of container 15 can be removed therefrom. Opening 47' is particularly useful when contents 23 are interleaved tissues that are to be removed from container 15.

Figures 13, 14:
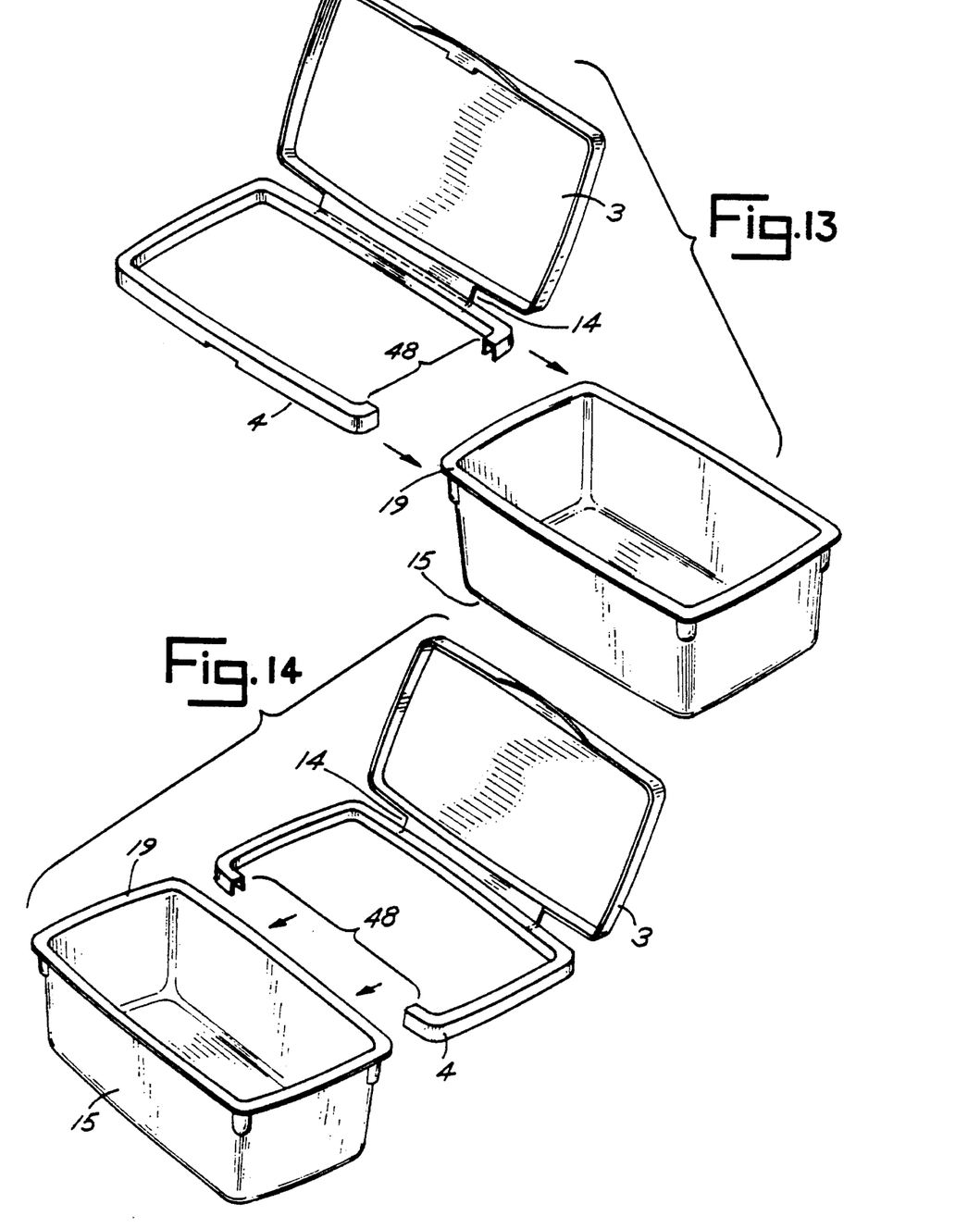

FIGS. 13 and 14 depict embodiments wherein the peripheral flange 4 is cut away so that the flange 4 can be top-slide loaded as well as bottom loaded onto container 15. In these alternative embodiments, the peripheral flange is substantially U-shaped and defines an opening 48. In FIG. 13, opening 48 is at an end adjacent to hinge 14. In FIG. 14, opening 48 is opposite hinge 14.

Figure 15:
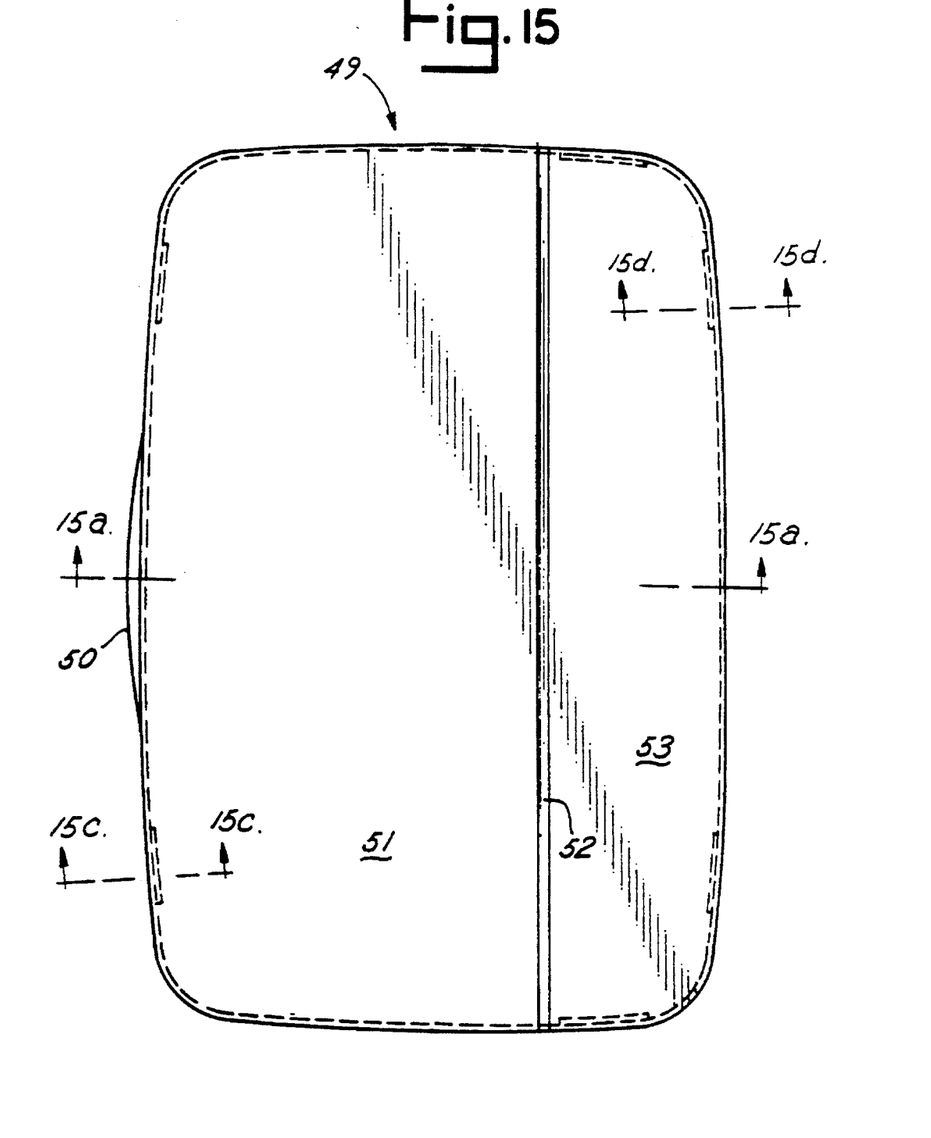
FIG. 15 is a top plan view of an alternative lid construction.
Figure 15A:
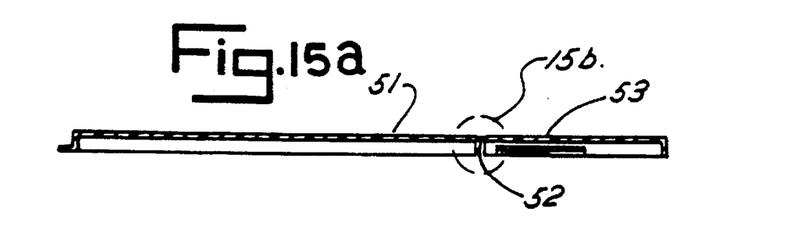
Figure 15B:
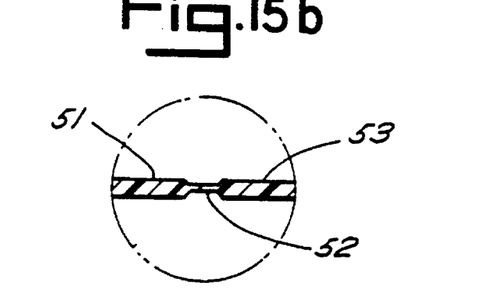
FIG. 15b is an enlarged cross-sectional detail of FIG. 15a at 15b.
Figure 15C:
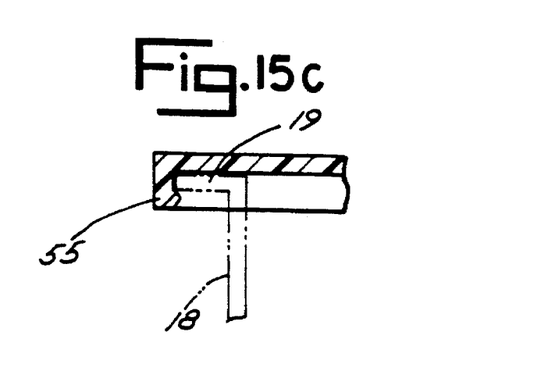
FIG. 15c is an enlarged cross-sectional view of FIG. 15 taken along the line 15c—15c.
Figure 15D:
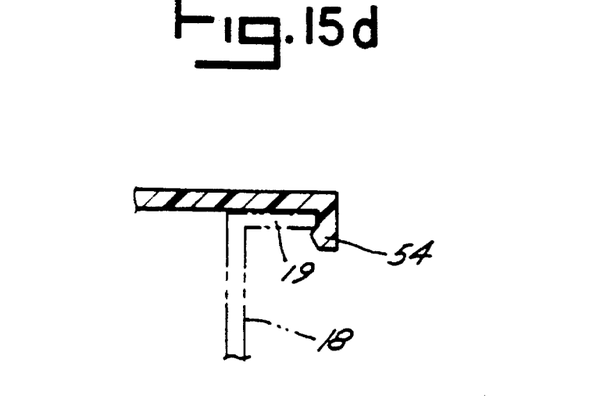
FIG. 15d is an enlarged cross-sectional detail of FIG. 15 taken along the line 15d—15d.

FIGS. 15 through 15d depict an alternative lid tray 49 having a tab 50. Tab 50 can be gripped to open or close the lid tray 49 over container 15. Lid tray 49 also has a first section 51 connected by integrally molded, living hinge 52 to second section 53. The first section 51 can pivot to an open position for access to contents 23 inside of container 15 or, alternatively to a closed position. Second section 53 has clips 54 that correspond to and are adapted to snap fit over rim 19 of container 15. The snap fit connection between clips 54 and rim 19 holds the second section 53 to container 15. First section 51 has clips 55 that fit over rim 19 of container 15. The gripping between clips 54 and rim 19 is stronger than the gripping between clips 55 and rim 19 so that first section 51 can be easily lifted off of rim 19 and so that second section 53 stays "snap fitted" to rim 19 as desired.

The foregoing detailed description of the invention has been made in general terms and with respect to several preferred embodiments. Many of the preferred apparatuses and methods stated herein may be varied by persons skilled in the art without departing from the spirit and scope of the present inventions as set forth in the following claims and equivalents.

What is claimed is:

1. A reusable cover and container construction comprising, in combination:
   (a) a cover having a lid tray and a peripheral flange,
      (i) the lid tray having a top face and a bottom face and a side wall substantially perpendicular to the top face and bottom face of the lid tray, the side wall having an outside surface and an inside surface,
      (ii) the peripheral flange having spaced outside and inside walls,
      (iii) the inside surface of the side wall of the lid tray being complementary to fit around the outside wall of the peripheral flange to form a first interface fit,
      (iv) the lid tray and the peripheral flange connected to each other by a hinge, permitting movement of the lid tray relative to the flange so that the angle between the lid tray and the peripheral flange can be altered and the first interface fit can be made or disengaged as desired, and
   (b) a container defining a cavity, the container having a bottom and outside walls and a rim that defines an opening to the cavity,
the peripheral flange being complementary to fit around the outside walls of the container and substantially abut against the rim of the container to form a second interface fit between the inside walls of the peripheral flange and the outside walls of the container adjacent to the rim, the second interface fit made when the peripheral flange is slid along the outside walls of the container until it substantially abuts against the rim of the container, the second interface fit disengaged when the peripheral flange is slid way from the rim, and when the second interface is made, the second interface fit holds the cover to the container, and when the second interface fit is disengaged, the cover can be removed from the container as desired, and wherein the container has four outside walls and the rim of the container extends out from and is substantially perpendicular to the outside walls of the container, and wherein at least one outside wall of the container has at least one lug positioned on the outside wall of the container substantially at the top of the outside wall adjacent to the rim of the container, and wherein the peripheral flange is complementary to fit around the outside walls of the container for retention by the lug.

2. The reusable cover and container construction of claim 1 wherein there is at least one lug on a corner formed by two adjacent outside walls of the container.

3. The reusable cover and container construction of claim 2 wherein there is at least one lug at each corner formed by the outside walls of the container.

* * * * *